(12) United States Patent  
Liu (10) Patent No.: US 9,413,180 B2
(45) Date of Patent: Aug. 9, 2016

(54) ELECTRONIC CIGARETTE CHARGER

(71) Applicant: Qiuming Liu, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days.

(21) Appl. No.: 14/504,312

(22) Filed: Oct. 1, 2014

(65) Prior Publication Data

US 2015/0054465 A1 Feb. 26, 2015

Related U.S. Application Data

(63) Continuation of application No. PCT/CN2013/082034, filed on Aug. 22, 2013.

(51) Int. Cl.
*H02J 7/00* (2006.01)

(52) U.S. Cl.
CPC ............ *H02J 7/0045* (2013.01); *H02J 7/0052* (2013.01); *H02J 2007/0062* (2013.01)

(58) Field of Classification Search
CPC .............................. H02J 7/0045; H02J 7/0052
USPC ........................................................ 320/114
See application file for complete search history.

(56) References Cited

U.S. PATENT DOCUMENTS

| | | | | |
|---|---|---|---|---|
| 4,794,315 A * | 12/1988 | Pederson | ................ | F21L 4/085 200/61.58 R |
| 5,309,336 A * | 5/1994 | Hartt | .................. | F21V 21/0965 320/114 |
| 5,648,712 A * | 7/1997 | Hahn | .................... | H01R 27/00 320/111 |
| 5,883,494 A * | 3/1999 | Kobayashi | ............ | H02J 7/0042 320/111 |
| 5,967,807 A * | 10/1999 | Wu | ........................ | H01R 29/00 439/131 |
| 7,170,258 B2 * | 1/2007 | Sakai | ..................... | H01R 35/04 320/111 |
| 8,973,587 B2 * | 3/2015 | Liu | ....................... | A24F 47/008 131/273 |
| 2005/0083012 A1 * | 4/2005 | Lee | ........................ | G06F 1/1632 320/114 |
| 2008/0194119 A1 * | 8/2008 | Mori | ................... | G06F 13/4022 439/13 |
| 2009/0015198 A1 * | 1/2009 | Brandenburg | ........ | H02J 7/0044 320/115 |
| 2009/0167241 A1 * | 7/2009 | Lee | ........................ | H02J 7/0045 320/111 |
| 2014/0307439 A1 * | 10/2014 | Chien | ................... | H02J 7/0042 362/253 |

FOREIGN PATENT DOCUMENTS

| | | |
|---|---|---|
| CN | 201021990 Y | 2/2008 |
| CN | 201403497 Y | 2/2010 |

(Continued)

OTHER PUBLICATIONS

International Search Report From PCT/CN2013/082034, Issued May 28, 2014, Application Published Feb. 26, 2015.

*Primary Examiner* — M'Baye Diao
(74) *Attorney, Agent, or Firm* — Tim Tingkang Xia, Esq.; Locke Lord LLP (57) ABSTRACT

An electronic cigarette charger is provided, which comprises a charge body that is configured to electrically connect an electronic cigarette, and a charge plug that is electrically connected to a source; the charge plug is mounted on the charge body in a rotatable way. The following beneficial effects will be achieved when implementing the application. In the electronic cigarette charger, the charge plug is mounted on the charge body in a rotatable way, so that the contour of the electronic cigarette charger can be changed through bending the charge plug with respect to the charge body. Therefore, the electronic cigarette charger can charge the electronic cigarette in narrow space, which may bring much convenience to the user.

9 Claims, 6 Drawing Sheets

(56) References Cited

FOREIGN PATENT DOCUMENTS

| CN | 201515249 U | 8/2010 |
| CN | 202340043 U | 7/2012 |
| CN | 202906526 U | 4/2013 |
| CN | 202930971 U | 5/2013 |
| CN | 203574392 U | 4/2014 |
| JP | 2012090427 A | 5/2012 |

* cited by examiner

ELECTRONIC CIGARETTE CHARGER

CROSS-REFERENCE TO RELATED APPLICATION

This application is a continuation application of International Patent Application No. PCT/CN2013/082034, by Qiuming LIU, filed Aug. 22, 2013, which is hereby incorporated herein in its entirety by reference.

FIELD OF THE APPLICATION

The present application relates to the field of daily electronic products, and more particularly, relates to an electronic cigarette charger.

BACKGROUND OF THE APPLICATION

Figure 1:
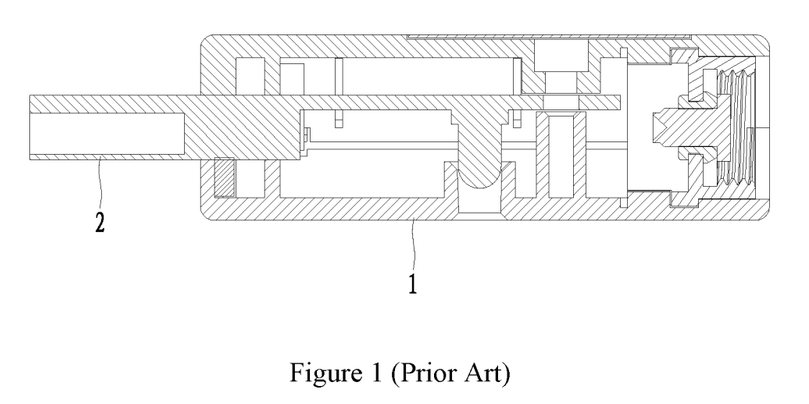
FIG. 1 is a structure diagram of an electronic cigarette charger in the prior art.

An electronic cigarette charger is used to charge an electronic cigarette, so as to improve the endurance of the electronic cigarette. Referring to FIG. 1, the traditional electronic cigarette charger always comprises a charge body 1 and a charge plug 2 that is fixed installed on the charge body 1. If the charging operation for the electronic cigarette is demanded to be carried out in narrow space, it is inconvenient or even impossible for the user to charge the electronic cigarette, because the charge plug 2 is fixedly installed on the charge body 1 so that the contour of the charger can't be changed. Besides, the electronic cigarette charger is easy to be damaged when the user collides with it from its side face accidently. In a word, the structure of the traditional electronic cigarette charger is not rational and humanized, which may bring much inconvenience to the user.

SUMMARY OF THE APPLICATION

The object of the present application is to provide an electronic cigarette charger, which is convenient for carrying out the charging operation in narrow space, aiming at the drawbacks that it is inconvenient to implement the charging operation in narrow space through the above electronic cigarette charger in the prior art.

The technical schemes to solve the above technical problems are as follows.

In one aspect, an electronic cigarette charger is provided, which comprises a charge body that is configured to electrically connect an electronic cigarette, and a charge plug that is electrically connected to a source, and the charge plug is mounted on the charge body in a rotatable way.

In one embodiment, the charge body comprises a housing and a containing slot that is provided on the housing; the charge plug is mounted on the containing slot in a rotatable way.

In one embodiment, the electronic cigarette charger further comprises a rotate base that is configured to mount the charge plug; the outer wall of the rotate base is provided with a rotate shaft that is convex; the side wall of the containing slot is provided with a mount slot that is matched with the rotate shaft; the rotate shaft is mounted in the mount slot in a rotatable way.

In one embodiment, the housing comprises a first housing and a second housing; a first containing slot set on the first housing and a second containing slot set on the second housing constitute the containing slot.

In one embodiment, a first mount slot defined on the side wall of the first containing slot and a second mount slot defined on the side wall of the second containing slot constitute the mount slot.

In one embodiment, wires are provided between the charge plug and the charge body, the wires are configured to electrically connect the charge plug with the charge body, and the wires are across the rotate shaft in the axial direction.

In one embodiment, the electronic cigarette charger further comprises a universal mechanism; the charge plug is mounted on the charge body via the universal mechanism in a rotatable way.

In one embodiment, the electronic cigarette charger further comprises a rotate base that is configured to mount the charge plug; the charge body comprises a housing; the universal mechanism comprises a universal shaft, a universal base fixedly mounted on the housing, and a universal cover mounted on the universal base; a universal joint of the universal shaft is inserted between the universal base and the universal cover in a rotatable way; the end of the universal shaft which is away from the universal joint is fixedly connected to the rotate base.

In one embodiment, the electronic cigarette charger further comprises a flexible shaft mechanism; the charge plug is mounted on the charge body via the flexible shaft mechanism in a rotatable way.

In one embodiment, the electronic cigarette charger further comprises a rotate base for mounting the charge plug; the charge body comprises a housing; the flexible shaft mechanism comprises a flexible shaft and a fix base that is fixedly mounted on the housing; the fix base and one end of the flexible shaft are buckled fixedly, the rotate base and the other end of the flexible shaft are buckled fixedly.

In one embodiment, the flexible shaft is made of soft rubber material.

In one embodiment, the flexible shaft is a metal hose.

In one embodiment, the charge plug is a USB charge plug.

The following beneficial effects will be achieved when implementing the electronic cigarette charger of the present application. In the electronic cigarette charger, the charge plug is mounted on the charge body in a rotatable way, so that the contour of the electronic cigarette charger can be changed through bending the charge plug with respect to the charge body. Therefore, the electronic cigarette charger can charge the electronic cigarette in narrow space. Besides, the structure of the electronic cigarette charger is rational and humanized. The electronic cigarette charger is hard to be damaged when the user collides with it from its side face accidently. Thus, it may bring much convenience to the user.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENTS

To make the objects, technical schemes and advantages more clearly, the present application may be further described in detail with reference to the accompanying drawings and embodiments.

Figure 2:
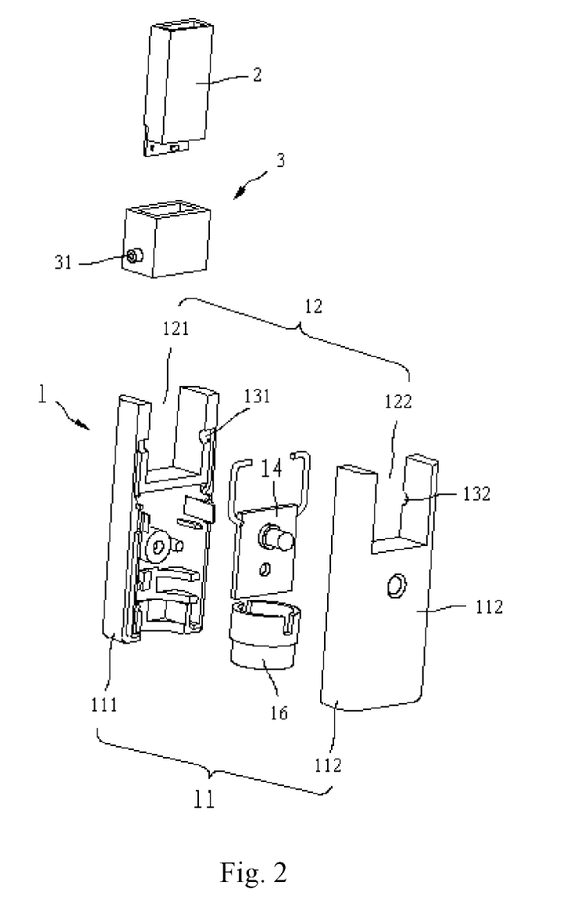
FIG. 2 is an explosive view of an electronic cigarette charger in one of the preferred embodiments of the present application.
Figure 5:
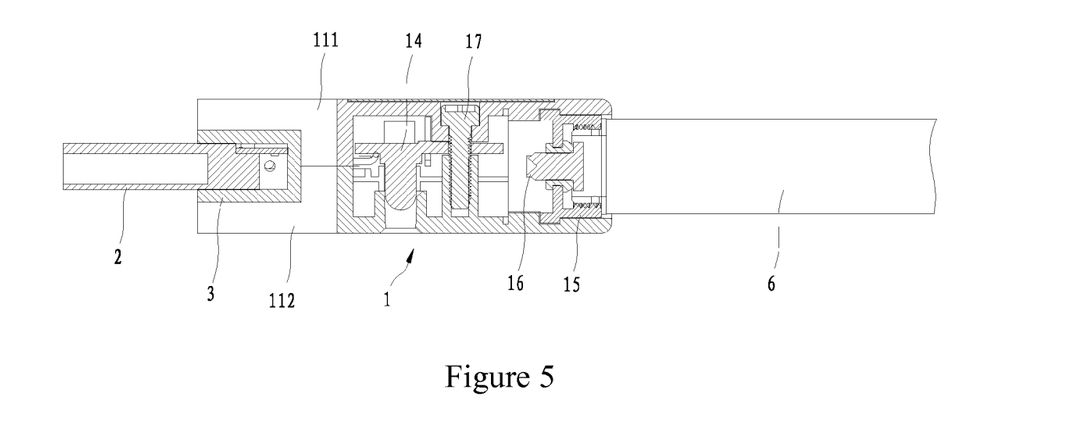
FIG. 5 is a structure diagram of the connection between the electronic cigarette charger shown in FIG. 2 and an electronic cigarette.

Referring to FIG. 2 and FIG. 5, an electronic cigarette charger in a first preferred embodiment is shown. The electronic cigarette charger comprises a charge body 1, a charge plug 2 and a rotate base 3.

Figure 3:
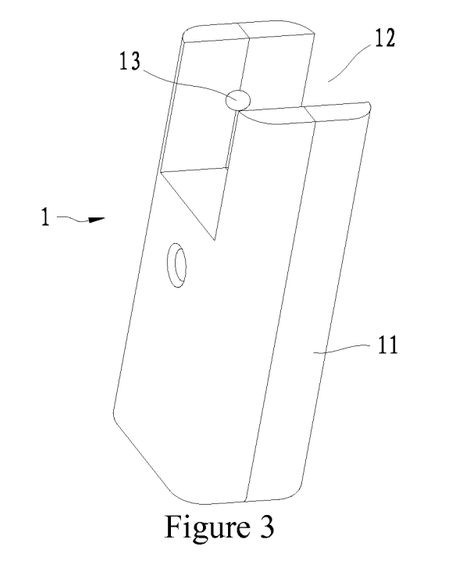
FIG. 3 is a structural diagram of the charge body in the electronic cigarette charger shown in FIG. 2.

Referring to FIG. 2, FIG. 3 and FIG. 5, the charge body 1 comprises a housing 11, a containing slot 12, a mount slot 13, a circuit board 14, a first electrode fastener 15, a second electrode fastener 16 and a threaded fastener 17. The housing 11 is substantially a rectangular parallelopiped. The containing slot 12 is substantially a U-shaped slot, which is located on the housing 11. The opening of the containing slot 12 is defined on the edge of one side of the housing 11. The containing slot 12 and the charge plug 2 are matched in the contour and size. The charge plug 2 is mounted on the containing slot 12 in a rotatable way. The mount slot 13 is a circular hole, which is defined on the side wall of the containing slot 12. The charge plug 2 can be rotated with respect to the mount slot 13. In the embodiment, there are two mount slots 13 which are set on two opposite side walls of the containing slot 12 respectively. The circuit board 14 is fixedly installed in the housing 11, and it is electrically connected to the charge plug 2. The first electrode fastener 15 and the second electrode fastener 16 are installed on the end of the housing 11 which is away from the containing slot 12. The first electrode fastener 15 and the second electrode fastener 16 are connected to the circuit board 14 respectively. The end of the charge body 1 that is away from the charge plug 2 is connected to the electronic cigarette 6. Namely, the first electrode fastener 15 and the second electrode fastener 16 are connected to the electronic cigarette 6 respectively, so that the charging operation for the electronic cigarette 6 can be carried out. In the embodiment, the housing 11 comprises a first housing 111 and a second housing 112. A first containing slot 121 set on the first housing 111 and a second containing slot 122 set on the second housing 112 constitute the containing slot 12 collectively. A first mount slot 131 defined on the side wall of the first containing slot 121 and a second mount slot 132 defined on the side wall of the second containing slot 122 constitute the mount slot 13 collectively. The first housing 111 and the second housing 112 are connected via the threaded fastener 17. The threaded fastener 17 may be a crew or the like.

Figure 4:
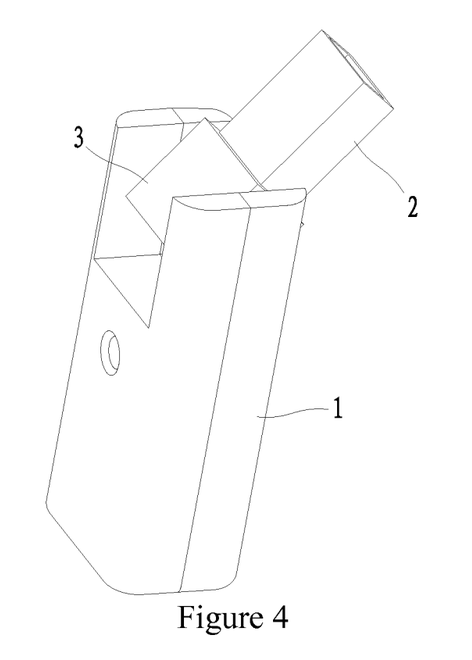
FIG. 4 is a three-dimensional structure diagram of the electronic cigarette charger shown in FIG. 2 when the charge plug is turned.

Referring to FIG. 2 and FIG. 4, the charge plug 2 is substantially a rectangular parallelopiped, which is fixedly mounted on the rotate base 3. A circuit (not labeled) that is connected to the circuit board 14 is provided inside the charge plug 2. Wires to connect the charge plug 2 with the circuit board 14 go across the mount slot 13 to achieve the electrical connection between the charge plug 2 and the circuit board 14. In the embodiment, the charge plug 2 is a USB charge plug, which can be electrically connected to the USB socket on the source.

Referring to FIG. 2, the rotate base 3 is substantially a block. A rotate shaft 31 is provided on the outer side wall of the rotate base 3, and the rotate shaft is convex. In the embodiment, the rotate shaft 31 is substantially a cylinder. There are two rotate shafts 31 which are located on two opposite outer side walls of the rotate base 3 respectively. The rotate shaft 31 is mounted in the mount slot 13 in a rotatable way, so that the rotate base 3 can be rotated with respect to the mount slot 13. Therefore, the charge plug 2 can be rotated with respect to the charge body 1. In this case, the wires which are electrically connected the charge plug 2 with the charge body 1 are across the rotate shaft 31 in the axial direction. As a result, the whole structure of the present disclosure is more concise, and no inconvenience will be brought to users since the wires are not messy.

Referring to FIG. 2, in the assembling process, the circuit board 14, the first electrode fastener 15 and the second electrode fastener 16 are installed on the first housing 111 correspondingly. Then the charge plug 2 is fixedly installed on the rotate base 3 and is electrically connected to the circuit board 14. Thirdly, the rotate shaft 31 is placed in the first containing slot 121. Finally, the second housing 112 is mounted on the first housing 111 and fixed through the threaded fastener 17.

Referring to FIG. 4, when in use, the charge plug 2 can be stirred to bend with respect to the charge body 1, thus changing the contour of the electronic cigarette charger. In this way, the electronic cigarette charger can charge the electronic cigarette even in narrow space. Besides, the structure is rational and humanized. When the user collides the electronic cigarette charger from its side face accidently, the charge body 1 can bend with respect to the charge plug 2, so the electronic cigarette charger will not be damaged easily, which may bring much convenience to the user.

Figure 6:
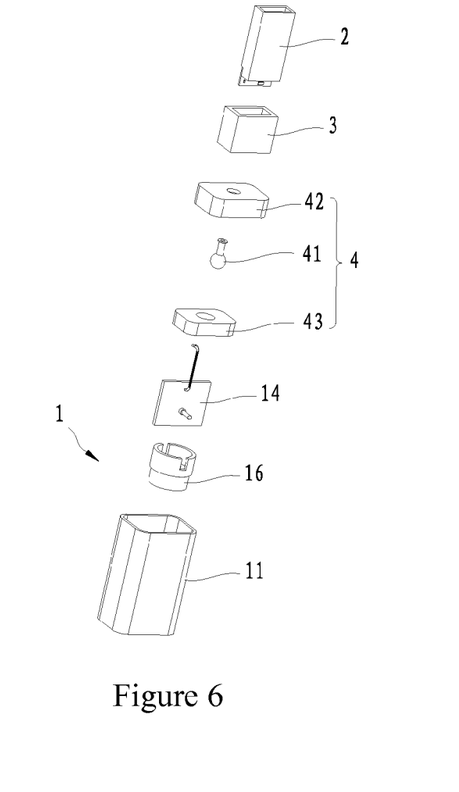
FIG. 6 is an explosive view of an electronic cigarette charger in another preferred embodiment of the present application.
Figure 7:
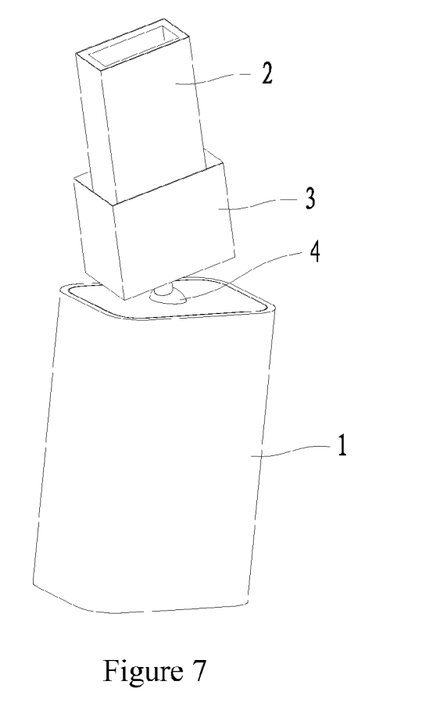
FIG. 7 is a three-dimensional structure diagram of the electronic cigarette charger shown in FIG. 6 when the charge plug is turned.
Figure 8:
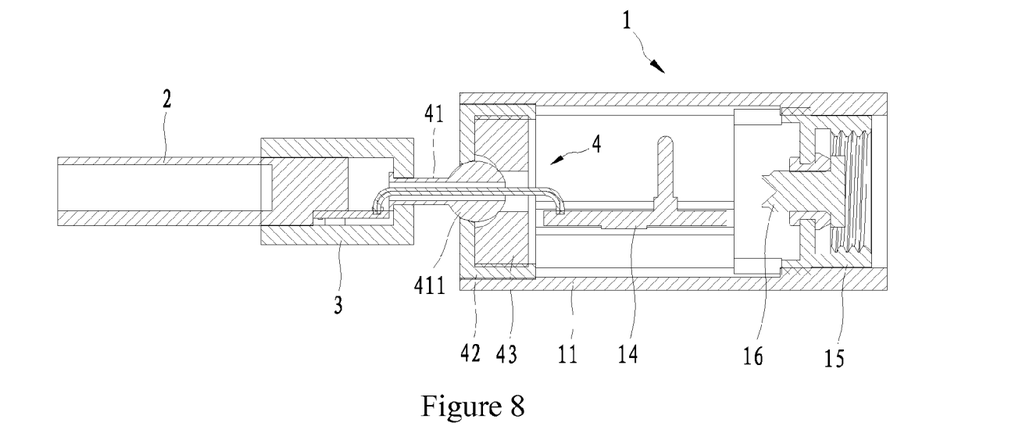
FIG. 8 is an internal structure diagram of the electronic cigarette charger shown in FIG. 6.

Referring to FIGS. 6-8, an electronic cigarette charger in a second preferred embodiment is shown. The second embodiment differs from the first embodiment in the structure of the charge body 1, the structure of the rotate base 3, and the connection between the charge body 1 and the charge plug 2. In the second embodiment, the electronic cigarette charger further comprises a universal mechanism 4. The charge body 1 comprises a housing 11, a circuit board 14, a first electrode connector 15 and a second electrode connector 16. The rotate shaft 31 of the rotate base 3 is omitted.

Referring to FIGS. 6 and 8, the universal mechanism 4 comprises a universal shaft 41, a universal base 42 and a universal cover 43. The universal shaft 41 comprises a universal joint 411. The universal joint 411 is substantially a sphere. The universal joint 411 is inserted in between the universal base 42 and the universal cover 43 in a rotatable way. The end of the universal shaft 41 which is away from the universal joint 411 is fixed connected to the rotate base 3. The wires to connect the charge plug 2 with the circuit board 14 go across the universal shaft 41 to achieve the electrical connection between the charge plug 2 and the circuit board 14. Each of the universal base 42 and the universal cover 43 is substantially a block, and the interior of each is provided with a room for containing the universal joint 411. The universal base 42 is fixedly mounted on the housing 11, and the universal cover 43 is mounted on the universal base 42. With the structure of the above universal mechanism 4, the charge plug 2 can be rotated with respect to the charge body 1 as well.

Figure 9:
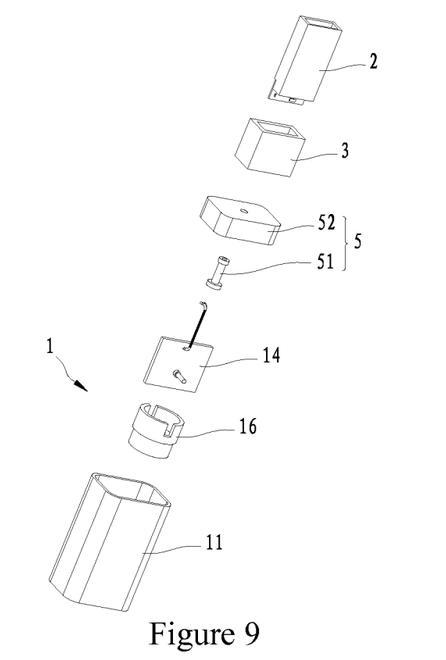
FIG. 9 is an explosive view of an electronic cigarette charger in a third preferred embodiment of the present application.
Figure 10:
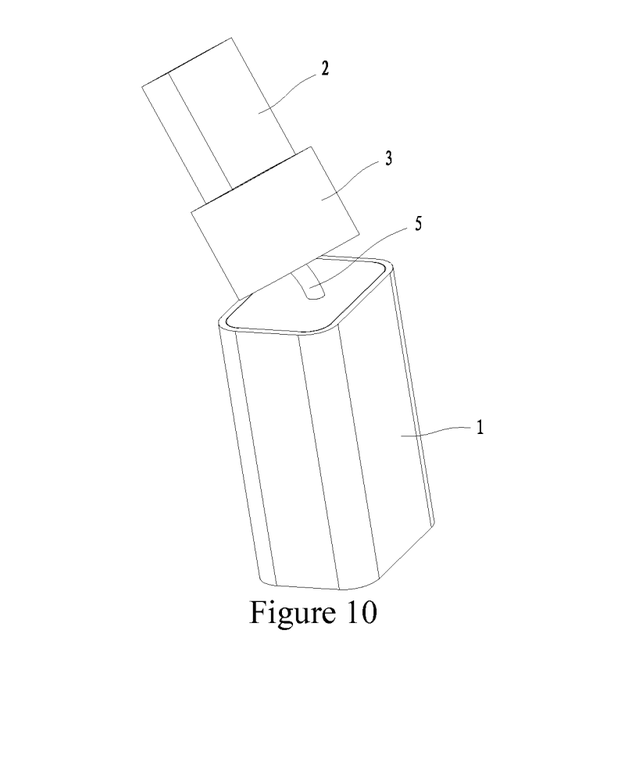
FIG. 10 is a three-dimensional structure diagram of the electronic cigarette charger shown in FIG. 9 when the charge plug is turned.
Figure 11:
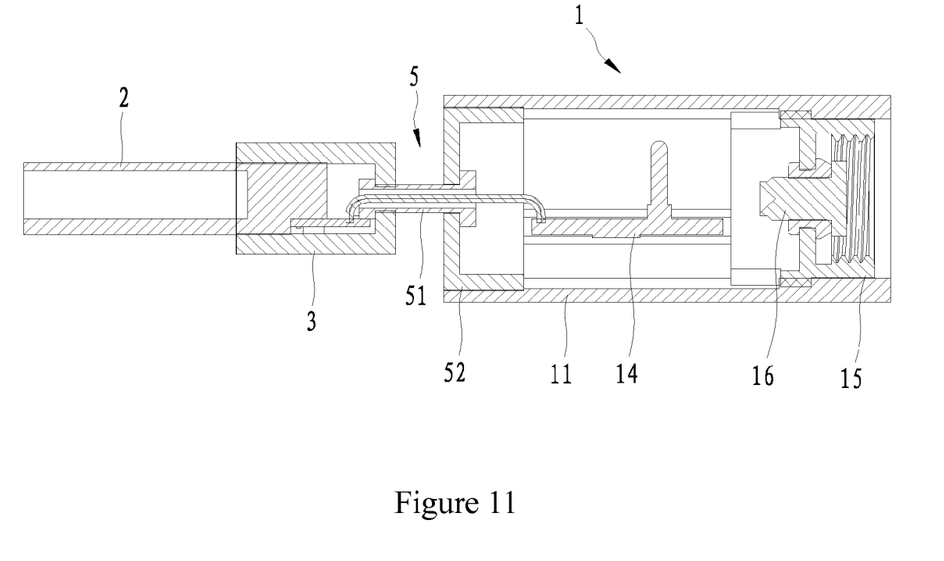
FIG. 11 is an internal structure diagram of the electronic cigarette charger shown in FIG. 9.

Referring to FIGS. 9-11, an electronic cigarette charger in a third preferred embodiment is shown. The third embodiment differs from the second embodiment in the connection between the charge body 1 and the charge plug 2. In the third embodiment, the electronic cigarette charger further comprises a flexible shaft mechanism 5.

Referring to FIG. 9 and FIG. 11, the flexible shaft mechanism 5 comprises a flexible shaft 51 and a fix base 52. The fix base 52 and one end of the flexible shaft 51 are buckled fixedly, the rotate base 3 and the other end of the flexible shaft 51 are buckled fixedly. The fix base 52 is fixedly mounted on the housing 11. The wires to connect the charge plug 2 with the circuit board 14 go across the flexible shaft 51 to achieve the electrical connection between the charge plug 2 and the circuit board 14. In the embodiment, the flexible shaft 51 is made of soft rubber material that has favorable bending performance. In other embodiments, the flexible shaft may be a metal hose which also has favorable bending performance. With the structure of the above flexible shaft mechanism 5, the charge plug 2 can be rotated with respect to the charge body 1 as well.

While the embodiments of the present application have been described with reference to the drawings, the present application will not be limited to above embodiments that are illustrative but not limitative. It will be understood by those skilled in the art that various changes and equivalents may be substituted in the light of the present application without departing from the scope of the present application, and those various changes and equivalents shall fall into the protection of the application.

What is claimed is:

1. An electronic cigarette charger comprising a charge body that is configured to electrically connect an electronic cigarette, and a charge plug that is electrically connected to a power source, wherein the charge plug is mounted on the charge body in a rotatable way;
   wherein the charge body comprises a housing and a containing slot that is provided on the housing; the charge plug is mounted on the containing slot in a rotatable way;
   wherein the electronic cigarette charger further comprises a rotate base that is configured to mount the charge plug; an outer wall of the rotate base is provided with a rotate shaft that is convex; a side wall of the containing slot is provided with a mount slot that is matched with the rotate shaft; the rotate shaft is mounted in the mount slot in a rotatable way.

2. The electronic cigarette charger according to claim 1, wherein the housing comprises a first housing and a second housing; a first containing slot set on the first housing and a second containing slot set on the second housing constitute the containing slot.

3. The electronic cigarette charger according to claim 2, wherein a first mount slot defined on a side wall of the first containing slot and a second mount slot defined on a side wall of the second containing slot constitute the mount slot.

4. The electronic cigarette charger according to claim 1, wherein wires are provided between the charge plug and the charge body, the wires are configured to electrically connect the charge plug to the charge body, and the wires are across the rotate shaft in the axial direction.

5. The electronic cigarette charger according to claim 1, wherein the charge plug is a USB charge plug.

6. An electronic cigarette charger comprising a charge body that is configured to electrically connect an electronic cigarette, and a charge plug that is electrically connected to a power source, wherein the charge plug is mounted on the charge body in a rotatable way;
   wherein the electronic cigarette charger further comprises a universal mechanism; the charge plug is mounted on the charge body via the universal mechanism in a rotatable way;
   wherein the electronic cigarette charger further comprises a rotate base that is configured to mount the charge plug; the charge body comprises a housing; the universal mechanism comprises a universal shaft, a universal base fixedly mounted on the housing, and a universal cover mounted on the universal base; a universal joint of the universal shaft is inserted between the universal base and the universal cover in a rotatable way; one end of the universal shaft, which is away from the universal joint, is fixedly connected to the rotate base.

7. An electronic cigarette charger comprising a charge body that is configured to electrically connect an electronic cigarette, and a charge plug that is electrically connected to a power source, wherein the charge plug is mounted on the charge body in a rotatable way;
   wherein the electronic cigarette charger further comprises a flexible shaft mechanism; the charge plug is mounted on the charge body via the flexible shaft mechanism in a rotatable way;
   wherein the electronic cigarette charger further comprises a rotate base for mounting the charge plug; the charge body comprises a housing; the flexible shaft mechanism comprises a flexible shaft and a fix base that is fixedly mounted on the housing; the fix base and one end of the flexible shaft are buckled fixedly, the rotate base and the other end of the flexible shaft are buckled fixedly.

8. The electronic cigarette charger according to claim 7, wherein the flexible shaft is made of soft rubber material.

9. The electronic cigarette charger according to claim 7, wherein the flexible shaft is a metal hose.

* * * * *